UNITED STATES PATENT OFFICE.

ROBERT KAHN, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

ARSENO COMPOUNDS AND PROCESS OF MAKING SAME.

1,026,094.      Specification of Letters Patent.      Patented May 14, 1912.

No Drawing.      Application filed July 19, 1911. Serial No. 639,413.

*To all whom it may concern:*

Be it known that I, ROBERT KAHN, Ph. D., a citizen of the Empire of Germany, residing at Frankfort-on-the-Main, Germany, have invented certain new and useful Improvements in New Arseno Compounds and Processes of Making Same, of which the following is a specification.

I have found that by reducing those substituted aromatic arsinic acids which contain salt-forming atom groups, for instance the hydroxyl-, amino-, carboxyl- or glycin-group, the corresponding arsins are obtained which are valuable for therapeutical purposes. It is possible to effect the transformation of the arsinic acids containing salt-forming atom groups into the corresponding primary arsins by the action of nascent hydrogen in a strongly acid solution.

The new compounds are primary aromatic arsins which, besides the atom group $AsH_2$, contain atom groups capable of forming salts; they are colorless or faint-yellow products, being easily oxidized and by the oxidation process first converted into arseno compounds; they are soluble in glacial acetic acid and concentrated sulfuric acid and capable of forming salts which are soluble in water. They are remarkable for their bactericidal action, for instance upon trypanosomes.

The following examples illustrate the invention:

Example I: 218 gr. of 4-oxphenylarsinic acid are dissolved in 2500 ccm. of methyl alcohol and 400 gr. of zinc dust are added to this solution. There are then gradually introduced 1.5 liters of hydrochloric acid (specific gravity 1.19) while well stirring; and the undissolved zinc dust is filtered off. The filtrate is extracted with ether and the ethereal solution shaken out with caustic soda-lye. The product of the reaction can be obtained from the alkaline solution in form of a white precipitate by introducing carbon-dioxid; this precipitate turns yellow when kept in store for some time and finally becomes red forming dioxyarsenobenzene; when heated to 75°C. the product assumes a dark coloration and completely decomposes at 155°C. It is soluble in caustic soda-lye, difficultly soluble in water, alcohol and ether.

Example II: 217 gr. of 4-aminophenylarsinic acid are dissolved in 2500 ccm. of methyl alcohol. To this solution are added 400 gr. of zinc dust and 1.5 liters of hydrochloric acid (specific gravity 1.19) introduced into it as indicated in Example I. After filtration of the undissolved zinc dust the filtrate is rendered alkaline and distilled with steam. The product of the reaction is extracted from the distillate by means of ether. After the ether has volatilized the new compound is obtained in the form of a white substance which gradually turns yellow. When heated it assumes a dark coloration at about 130° C. and decomposes. It is soluble in glacial acetic acid and very difficultly soluble in alcohol.

Example III: 275 gr. of phenylglycinarsinic acid are dissolved in 1500 ccm. of hydrochloric acid (specific gravity 1.19). To this solution are gradually added 400 gr. of zinc dust while well shaking and keeping the temperature moderate, whereupon first a yellow precipitate forms and afterward a yellow solution which finally becomes colorless. The undissolved zinc dust is then filtered off and to the filtrate is added a solution of 2½ kilos of crystallized sodium acetate in 2½ liters of water. Thus the zinc chlorid salt of the reduction product separates in the form of a white precipitate which is filtered and levigated into a magma and boiled with an excess of a soda solution. The sodium salt of the product of the reaction thus dissolved is filtered from the separated zinc-carbonate. From this filtrate the free acid of the product of the reaction, when acidulated with hydrochloric acid, separates in the form of a faint-yellow precipitate. This compound soon assumes a deeper yellow coloration and decomposes, showing a dark coloration when heated over 100° C. It is very difficultly soluble in water, alcohol and ether.

Example IV: 263 gr. of the 4-oxy-3-nitrophenylarsinic acid are dissolved in 3 liters of hydrochloric acid (specific gravity 1.19). To this solution are gradually added 800 gr. of zinc dust while keeping the temperature moderate, whereupon a dirty looking precipitate forms which gradually changes to a dark solution. This solution is diluted with 6 liters of water and heated whereupon it soon becomes colorless; if all the zinc dust has been consumed, before the solution becomes entirely clear, a further quantity of it is added. The excess of zinc dust is then filtered and from the filtrate the double salt of zinc chlorid of the reaction product crystallizes on cooling in the form of a white precipitate soluble in water. By decomposing the said double salt with sodium acetate and dissolving in ether, the free arsin is obtained, which can be extracted from the ethereal solution by means of caustic soda-lye and separated from the latter by means of acetic acid. It forms a powder which when heated over 100° C. assumes a dark coloration and completely decomposes at 135° C. It is soluble in caustic soda-lye and hydrochloric acid, alcohol and ether, very little soluble in water.

Having now described my invention what I claim is:

1. As new products, the aromatic primary arsins which besides the arsin group $AsH_2$, contain salt-forming atom groups; being colorless to faint-yellow compounds, soluble in glacial acetic acid and concentrated sulfuric acid, being easily oxidized and converted thereby into arseno compounds; capable of forming salts which are soluble in water.

2. The process of producing arsins, which consists in treating those aromatic arsinic acids which contain salt-forming atom groups as substituents, with nascent hydrogen in a strongly acid solution.

3. The process of producing arsins, which consists in treating those aromatic arsinic acids which contain salt-forming atom groups as substituents, with zinc and hydrochloric acid in a strongly acid solution.

4. The process of producing arsins, which consists in treating those aromatic arsinic acids which contain a hydroxyl group, with nascent hydrogen in a strongly acid solution.

5. The process of producing arsins, which consists in treating those aromatic arsinic acids which contain a hydroxyl group and an amino group, with nascent hydrogen in a strongly acid solution.

In testimony whereof, I affix my signature in presence of two witnesses.

ROBERT KAHN.

Witnesses:
 JEAN GRUND,
 CARL GRUND.